United States Patent [19]

De With et al.

[11] Patent Number: 5,583,651
[45] Date of Patent: Dec. 10, 1996

[54] METHOD OF AND SYSTEM FOR TRANSMITTING AND RECEIVING DIGITALLY ENCODED VIDEO IMAGES

[75] Inventors: Peter H. N. De With; Stephanus J. J. Nijssen; Albert M. A. Rijckaert; Gerrit J. Keesman, all of Eindhoven, Netherlands

[73] Assignee: U.S. Philips Corporation, New York, N.Y.

[21] Appl. No.: 601,270

[22] Filed: Feb. 14, 1996

Related U.S. Application Data

[63] Continuation of Ser. No. 416,943, Apr. 4, 1995, abandoned, which is a continuation of Ser. No. 3,357, Jan. 12, 1993, abandoned.

[30] Foreign Application Priority Data

Jan. 13, 1992 [EP] European Pat. Off. .............. 92200069
Dec. 14, 1992 [EP] European Pat. Off. .............. 92203883

[51] Int. Cl.$^6$ .............................. H04N 5/76; H04N 5/783
[52] U.S. Cl. ............................................................. 386/68
[58] Field of Search ..................................... 358/335, 342, 358/312, 310; 360/48, 32, 10.1, 35.1; 348/384, 409, 415; H04N 5/76, 5/783

[56] References Cited

U.S. PATENT DOCUMENTS 4,907,101  3/1990  Keesen et al. ..................... 360/48
5,023,710  6/1991  Kondo et al. ..................... 358/133
5,068,744  11/1991 Ito ..................................... 358/310
5,136,391  8/1992  Minami .............................. 358/310
5,196,933  3/1993  Henot ................................ 358/133
5,291,282  3/1994  Nakagawa et al. ............... 348/384
5,337,194  8/1994  Wilkinson ......................... 358/310

FOREIGN PATENT DOCUMENTS 0448491  9/1991  France .
9102430  2/1991  WIPO .

*Primary Examiner*—Thai Q. Tran
*Assistant Examiner*—Huy Nguyen
*Attorney, Agent, or Firm*—Michael E. Marion

[57] ABSTRACT

Video images are encoded by transform coding, resulting in data blocks each including a DC-coefficient and a plurality of AC-coefficients. The coefficients of a number of said transform blocks are variable-length encoded and transmitted. In order to avoid a complete loss of datablocks in case of a transmission error, the most significant codewords of a group of blocks are transmitted first so as to achieve that at least the DC-level of the blocks is likely to be retained. The coefficients may also be recorded on a videorecorder. Fast playback of recorded images so encoded, leads to very poor quality because some data blocks are not being read in the search mode. To improve this quality the DC-coefficients and if desired predetermined AC-coefficients of selected ones of the transform blocks to be recorded on one track are packed together to form a DC-packet and such packet is recorded on a selected part of the track. The DC-packet is chosen such that it can be read out as a unit at various search speeds, and can be read partially at higher search speeds.

29 Claims, 6 Drawing Sheets

| FRAME NR. | TRACK SHUFFLING |
|---|---|
| n | → ① 2 3 4 5 6 |
| n+1 | 2 3 4 5 6 1 |
| n+2 | ③ 4 5 6 1 2 |
| n+3 | 4 5 6 1 2 3 |
| n+4 | → ⑤ 6 1 2 3 4 |
| n+5 | 6 1 2 3 4 5 |
| | |
| n+6 | ② 3 4 5 6 1 |
| n+7 | 3 4 5 6 1 2 |
| n+8 | → ④ 5 6 1 2 3 |
| n+9 | 5 6 1 2 3 4 |
| n+10 | ⑥ 1 2 3 4 5 |
| n+11 | 1 2 3 4 5 6 |
| | |
| n+12 | → ② 3 4 5 6 1 |
| n+13 | 3 4 5 6 1 2 |
| n+14 | ④ 5 6 1 2 3 |
| n+15 | 5 6 1 2 3 4 |
| n+16 | → ⑥ 1 2 3 4 5 |
| n+17 | 1 2 3 4 5 6 |
| | |
| n+18 | ① 2 3 4 5 6 |
| n+19 | 2 3 4 5 6 1 |
| n+20 | → ③ 4 5 6 1 2 |
| n+21 | 4 5 6 1 2 3 |
| n+22 | ⑤ 6 1 2 3 4 |
| n+23 | 6 1 2 3 4 5 |

○ = READ AT 12 $V_0$
→ = READ AT 24 $V_0$

METHOD OF AND SYSTEM FOR TRANSMITTING AND RECEIVING DIGITALLY ENCODED VIDEO IMAGES

This is a continuation of application Ser. No. 08/416,943, filed Apr. 4, 1995, abandoned, which is a continuation of Ser. No. 08/003,357, filed Jan. 12, 1993, abandoned.

FIELD OF THE INVENTION

The invention relates to a method of and a system for transmitting and receiving digitally encoded video images. Transmitting and receiving digitally encoded video images are also to be understood to mean their recording and playback. The invention further relates to video recorders and, more specifically, to video recorders operated at higher than recording speed.

BACKGROUND OF THE INVENTION

Various methods of encoding video images are known in the art. Currently preferred encoding methods are based on Discrete Cosine Transformation (DCT) by which blocks of pixels, or blocks of differences between actual and predicted pixels, are transformed into coefficients representing spectral components of the video image. The DCT-coefficients of each block are scanned in a predetermined order corresponding to their significance. The first coefficient is the most significant one. This coefficient generally represents the DC level of the block and is further referred to as the DC coefficient. The others are AC coefficients. After quantization, the coefficients may be applied to a Variable Length Coder (VLC).

When subjected to variable length coding, each block of pixels is conveyed as a sequence of codewords of variable length. In order to avoid a total loss of synchronization when a transmission error occurs, a special sync code is transmitted regularly to indicate the start of a group of blocks. A transmission error now only affects the recovery of codewords being transmitted until the next sync code.

Despite the sync code, a problem of the transmission format mentioned above remains its lack of robustness against transmission errors. A single transmission error may still result in erroneous decoding of VLC-codewords up to the detection of a subsequent sync code. Consequently, a transmission error causes the loss of a number of DCT-blocks and thus affects a significant part of the video image.

Similar problems arise in video recorders. When digitally encoded video images are played back at a higher than recording speed, only part of the data on each track is read out. Substantial parts of the data for an image are now not received at all. An approach to this problem is given in Patent Application EP-A 0 509 594. In accordance with the method and apparatus disclosed in that application, the image is recorded on the recording medium in such a way that bursts of data read from the tape at the highest speeds each constitute a macro-segment defining an area of the image. Further, a different segment, i.e. a different area of the image, is read out during each of a plurality of sequential frames. These segments are stored until all pans of an image have been assembled. This method and apparatus do not compromise picture quality during playback at the recording speed. The operation in search modes is also good when images with relatively low motion content are concerned. For images with higher motion content some improvement is desirable.

SUMMARY OF THE INVENTION

It is an object of the invention to furnish a method of and a system for transmitting and receiving digitally encoded video images which is less sensible to loss of data. It is also an object of the invention to furnish a method of and a system for recording video images in which good picture quality is obtained during playback at higher speeds, even for images having a substantial motion content.

According to the invention, the method comprises the steps of:
  dividing each image into a plurality of blocks, each block defining an incremental area of the image;
  generating encoded block data for each block, said block data comprising codewords in decreasing order of significance;
  transmitting, for a group of blocks, at least the most significant bit of the most significant codeword of each block of said group prior to transmitting the less significant codewords of each block.

The invention is based on the following recognition. The earlier a transmission error occurs after a sync code, the more subsequent codewords are irrecoverable. Or, in other words, the later a codeword is transmitted, the higher its probability of being irrecoverable. The invention provides the possibility of first transmitting the most significant bit of all the DC coefficients of a group of dam blocks so that at least the corresponding most significant portion of the DC level of each block can most likely be reconstructed.

With respect to recording digitally encoded images, the method comprises the steps of:
  generating image data defining each of said images, said image data comprising encoded block data for each of a plurality of blocks, each defining an incremental area of an image, said encoded block data comprising a DC coefficient, a plurality of most significant AC coefficient and a plurality of less significant AC coefficients;
  recording said encoded block data for a given track so that at least the most significant bits of selected ones of the DC coefficients are packed together and recorded as a packet on a predetermined part of a track; and
  similarly recording selected ones of said DC coefficients of others of said blocks on the remainder of said tracks.

It is noted that the term "most significant AC-coefficients" may include all these coefficients corresponding to preselected spacial frequencies. It may also include a predetermined number (say Q) of AC-coefficients having the largest magnitude.

DESCRIPTION OF EMBODIMENTS

Figure 1A:
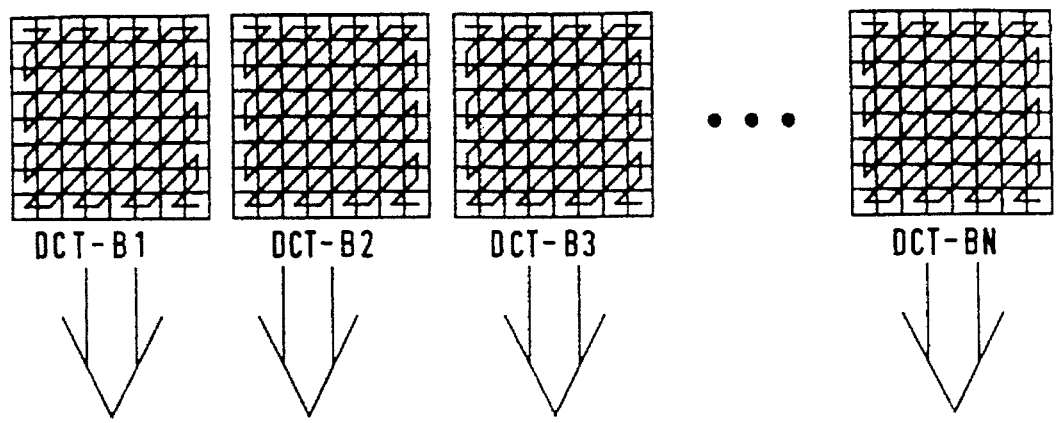
FIG. 1 shows a known method of transmitting digitally encoded video images.
Figure 1B:
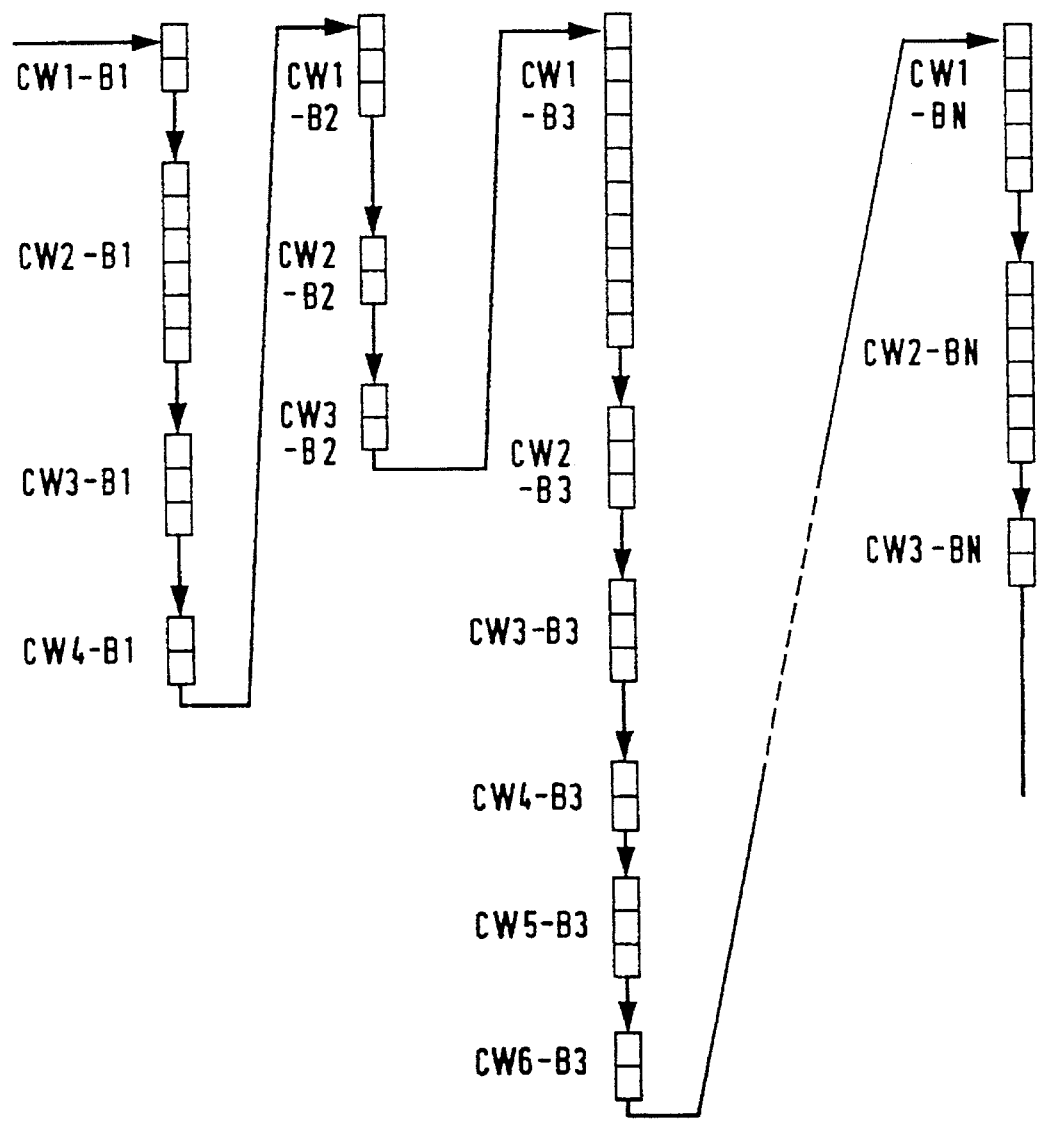

FIG. 1 shows a known method of transmitting digitally encoded video images. The image is divided into a plurality of blocks, each block comprising, for example, 8*8 pixels. The blocks of pixels are then subjected to a discrete cosine transform (DCT). Alternatively, blocks of prediction errors (differences between actual and predicted pixels) are subjected to DCT. DCT results in a data block of 8*8 coefficients for each block of 8*8 pixels. A group of N data block DCT-B 1, DCT-B2, ... DCT-BN is shown in FIG. 1A. Such a group constitutes, for example, a horizontal image segment having a height of eight video lines. The coefficients of each individual data block are scanned in a predetermined order corresponding to their significance. As is shown in FIG. 1A, this scanning usually takes the form of a zig-zag pattern. The 64 coefficients of each block are then subjected to variable-length-coding. In this coding operation, the coefficients having the value zero (null-coefficients) are not separately coded but they are concatenated with a non-null-coefficient. The VLC-coder thus provides, for each block, a variable number of variable-length codewords. The first codeword is indicative of the DC-level of the block of pixels. The last codeword is an EOB-code indicating the end of the block. In FIG. 1B, the first data block DCT-B1 of the group is encoded in four codewords CW1-B1, CW2-B1, CW3-B1 and CW4-B1. Each rectangle in FIG. 1B represents a single bit of the codeword. Thus, FIG. 1B indicates that the codewords of the first data block DCT-B1 have a length of 2, 6, 3 and 2 bits, respectively. The other blocks Bi are similarly encoded in codewords CW1-Bi, CW2-Bi, ... etc.

The arrows interconnecting the codewords of the group of blocks in FIG. 1B show a conventional order of transmission of the codewords. The codewords CW1, CW2, ... of the first data block B1 of the group are transmitted first, then the codewords CW1, CW2, ... of the second data block B2, etc. Finally, the codewords CW1, CW2 ... of the last data block BN are transmitted. A sync code (not shown) precedes the transmission of all codewords of the group of data blocks B1, B2, ... BN. It is assumed that the sync code is always reliably detected at the receiver end. If a transmission error occurs, the codewords following the error up to the sync code of a next group of data blocks may no longer be recovered. As FIG. 1B clearly illustrates, such an error causes a number of data blocks to be lost completely.

Figure 2:
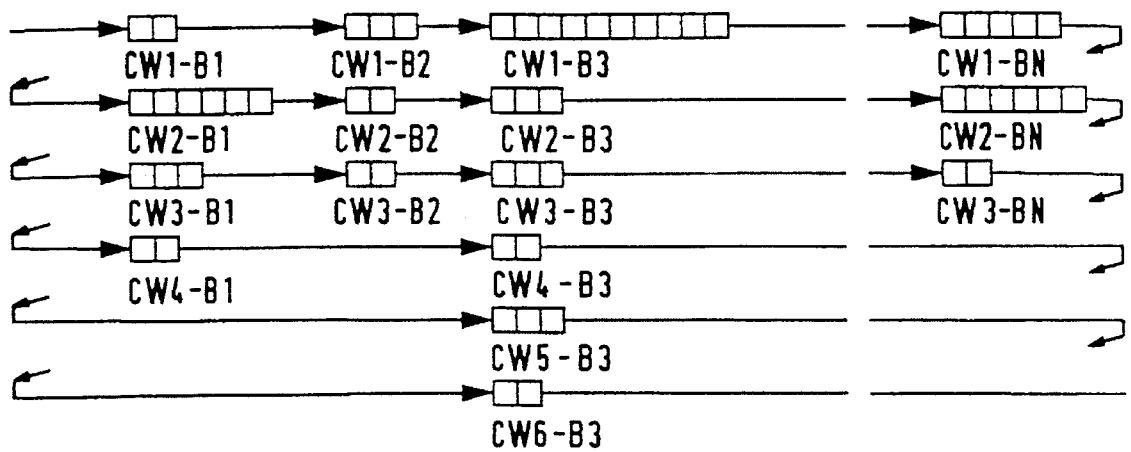
FIG. 2 shows a method of transmitting digitally encoded video images according to the invention.

FIG. 2 shows a method of transmitting the digital video image according to the invention. The codewords are the same as in FIG. 1, but now they are shown horizontally. The arrows indicate the new order of transmission, from left to right and from top to bottom. After the sync code (not shown), the first codewords CW1-Bi of each data block DCT-Bi (i=1..N) are now transmitted first, then the second codewords CW2-Bi of each block DCT-Bi, then the third codewords CW3-Bi, etc. If a transmission error occurs, the subsequent codewords up to the next sync code can no longer be recovered. The codewords preceding the error are unaffected. Thus, unless the error occurs in the transmission of the first N codewords, at least each first codeword CW1 (i.e. the DC level) of any block of the group is still recovered. This results in a better overall picture quality than in the prior art method where some blocks are not affected while other blocks are not received at all. The later an error occurs, the more image details of each block can be reconstructed.

Figure 3:
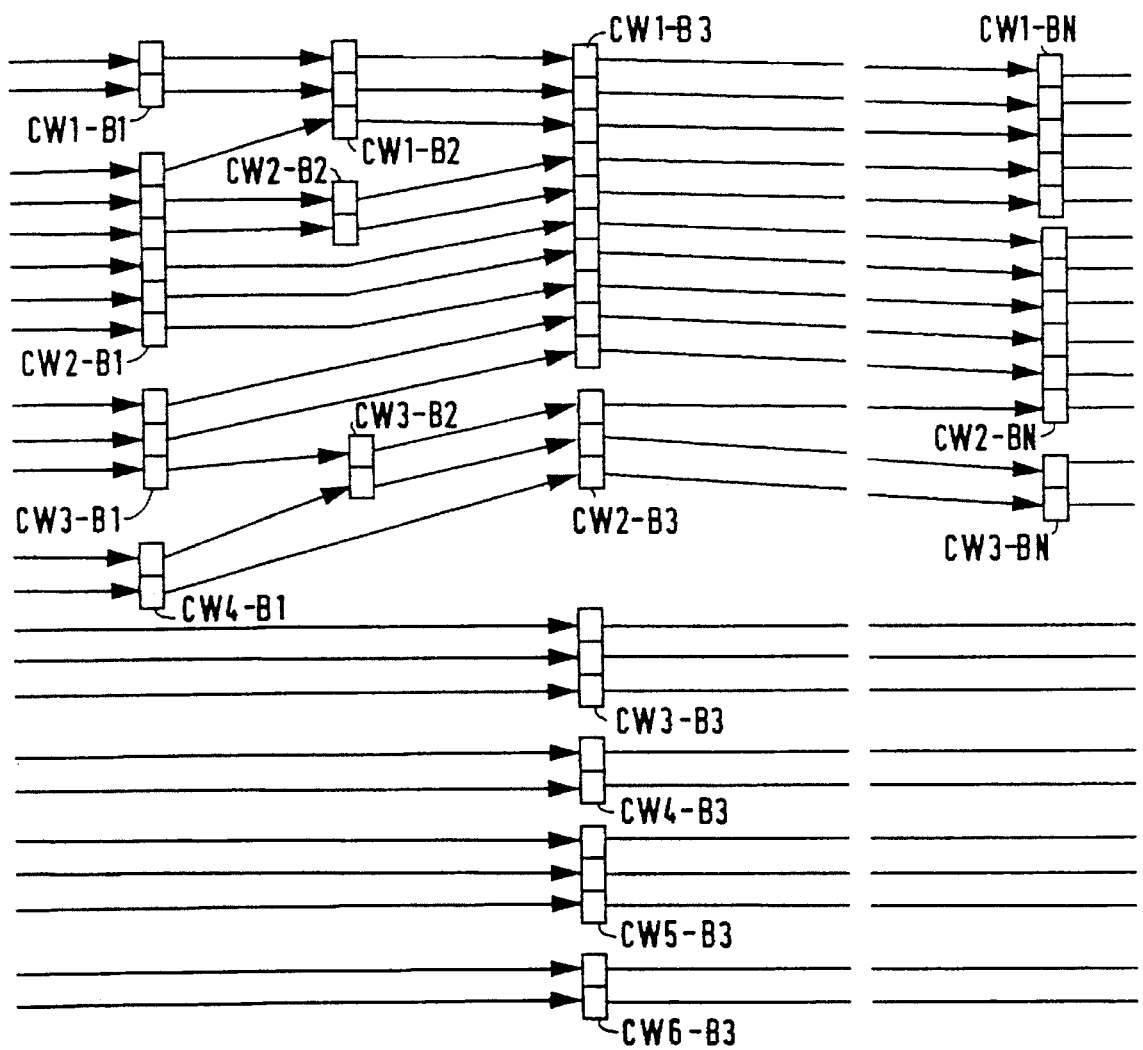
FIG. 3 shows a further embodiment of the transmission method.

FIG. 3 shows a further embodiment of the transmission method. As the arrows indicate, the most significant bit of the first codeword CW1 of each block is now transmitted first. Then the second bit of the first codeword of each block follows, etc. Thus, unless the error occurs in the transmission of the first N bits after the sync code, at least the most significant portion of the DC level of each block can be reconstructed.

Figures 4A, 4B:
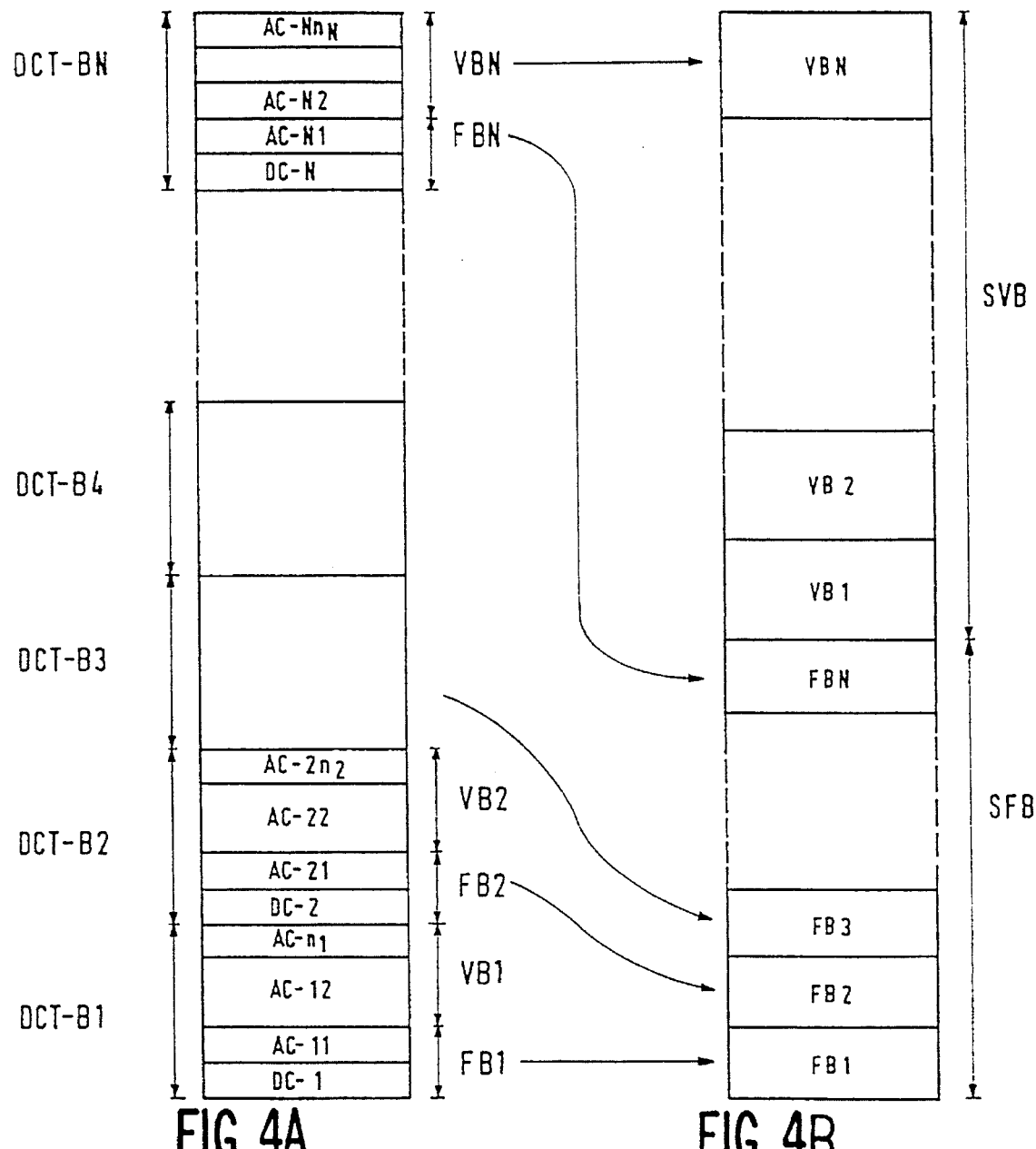
FIG. 4A shows one track of a recording medium with conventional block sequential recording.
FIG. 4B shows a track of the recording medium having information recorded thereon in accordance with the present invention.

FIG. 4A shows a known method of recording information on a track of a recording medium, e.g. a tape. Again, the image is divided into a plurality of blocks, each block encompassing, for example, 8×8 pixels. These blocks are then subjected to, for example, discrete cosine transform. Resulting data is recorded on the tape. In FIG. 4A such data block is indicated DCT-Bi wherein i=1, 2, ... N. It is now assumed that the DC coefficient and the most significant AC coefficient are recorded in a fixed format, in FIG. 4A indicated FBi, followed by the remaining AC coefficients for example in decreasing order of significance encoded in variable wordlength coding, in FIG. 4A indicated VBi. The same order is then followed for sequential blocks until the track is filled.

Figure 5A:
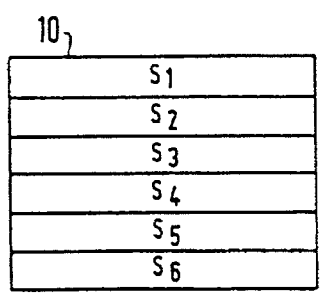
FIGS. 5A and 5B show ways of partitioning an image into segments.
Figure 5B:
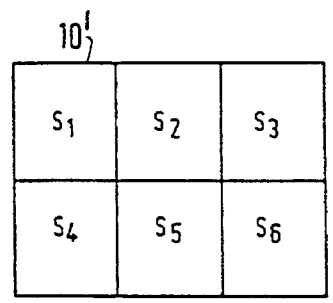
Figure 5:
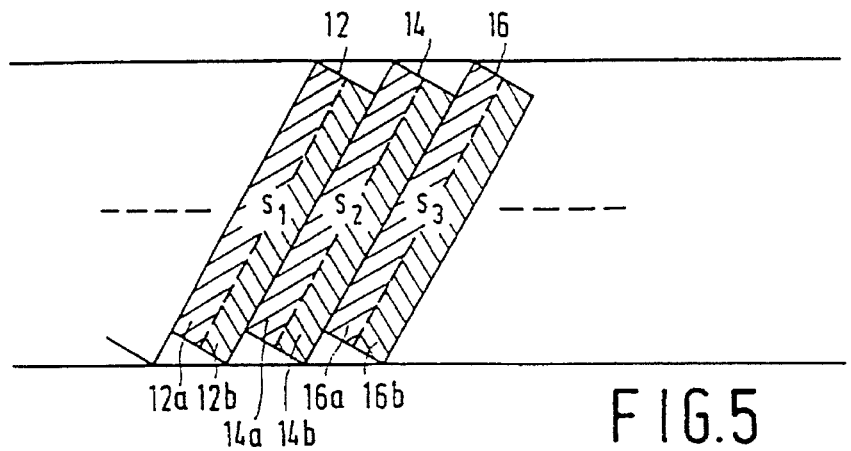
FIG. 5C shows a couple of tracks on the tape.

In accordance with a preferred embodiment of the present invention, the image to be displayed is divided into segments, each segment being recorded on a track. FIGS. 5A and 5B show two ways in which a displayed image 10 may be divided into six segments, S1, S2, S3 etc. FIG. 5C shows three tracks 12, 14 and 16 on which segments S1, S2, S3 will, respectively, be recorded. The remaining tracks, namely those for recording segments S4, S5 and S6 are identical and therefore not illustrated. It is noted that in consumer video recorders each track is partitioned into two sub-tracks each comprising pan of the information of the corresponding segment. In FIG. 5C such sub-tracks are indicated by the reference numerals 12a, 12b for track 12, by 14a, 14b for track 14 etc. In order to avoid a mutual influence of the information on adjacent sub-tracks when such information is read from the tape, the well known azimuth recording is used. In FIG. 5C this is indicated by the herring-bone structure.

Figure 6:
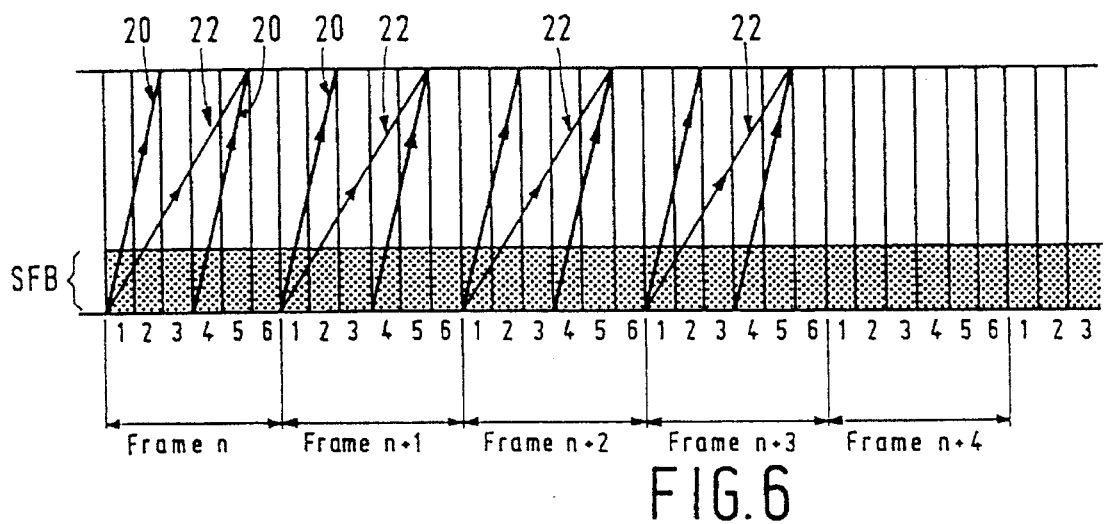
FIG. 6 shows the tracks associated with fine sequential frames.

FIG. 6 illustrates the tracks associated with five sequential frames. For simplicity the tracks are drawn in a vertical direction, whereas in practice they will show an angle with the tape direction (confer FIG. 5C). In this embodiment each frame has six tracks associated therewith. When playback takes place at the recording speed, the playback heads scan each track along what is, in FIG. 6, the vertical axis. This is not the case for search scans at higher than the recording speeds. Specifically, line 20 illustrates the path of the heads relative to the tape at three times the recording speed, while the lines numbered 22 illustrate the path of the heads relative to the track at six times the recording speed. Even though FIG. 6 represents simplified conditions such as linear tracks and heads having a width equal to the width of the associated tracks, it can be seen that only parts of the tracks will be read at the higher search scan speeds and that, specifically, the pan of each track that is read out will decrease with an increase in the search scan speed. Specifically, it can be shown that for the above model using a scanner with two diametrical heads at 180° apart, and assuming that the signal-to-noise ratio (SNR) is allowed to drop with a factor two, then the fraction of each track which will be read out is equal to $$1/[2\,(p-1)]$$

where p is the ratio of the search speed to the recording speed.

The problem solved by the present invention is thus to arrange the information of the tape in such a way that reconstruction of the total image is possible at a number of search speeds higher than the recording speed, even if some degradation of the image occurs.

One way in which image defining data is recorded on a track of a recording medium in accordance with the present invention is shown in FIG. 4B. There, the fixed part of the first block is followed by the fixed part of the second block, etc. until the complete fixed data for the track, namely, in the preferred embodiment, the fixed data for 1620 blocks (in general M/6 wherein M is the number of blocks of an image) has been recorded in a super fixed block SFB. Thereafter, all the variable wordlength data for block 1, the corresponding information for block 2 etc. will be recorded until all of the variable wordlength data associated with that track has been entered in a super variable block SVB. As a result, about 25% of the tracklength is taken up with the most significant DC and AC data for all blocks on the track.

Figure 7:
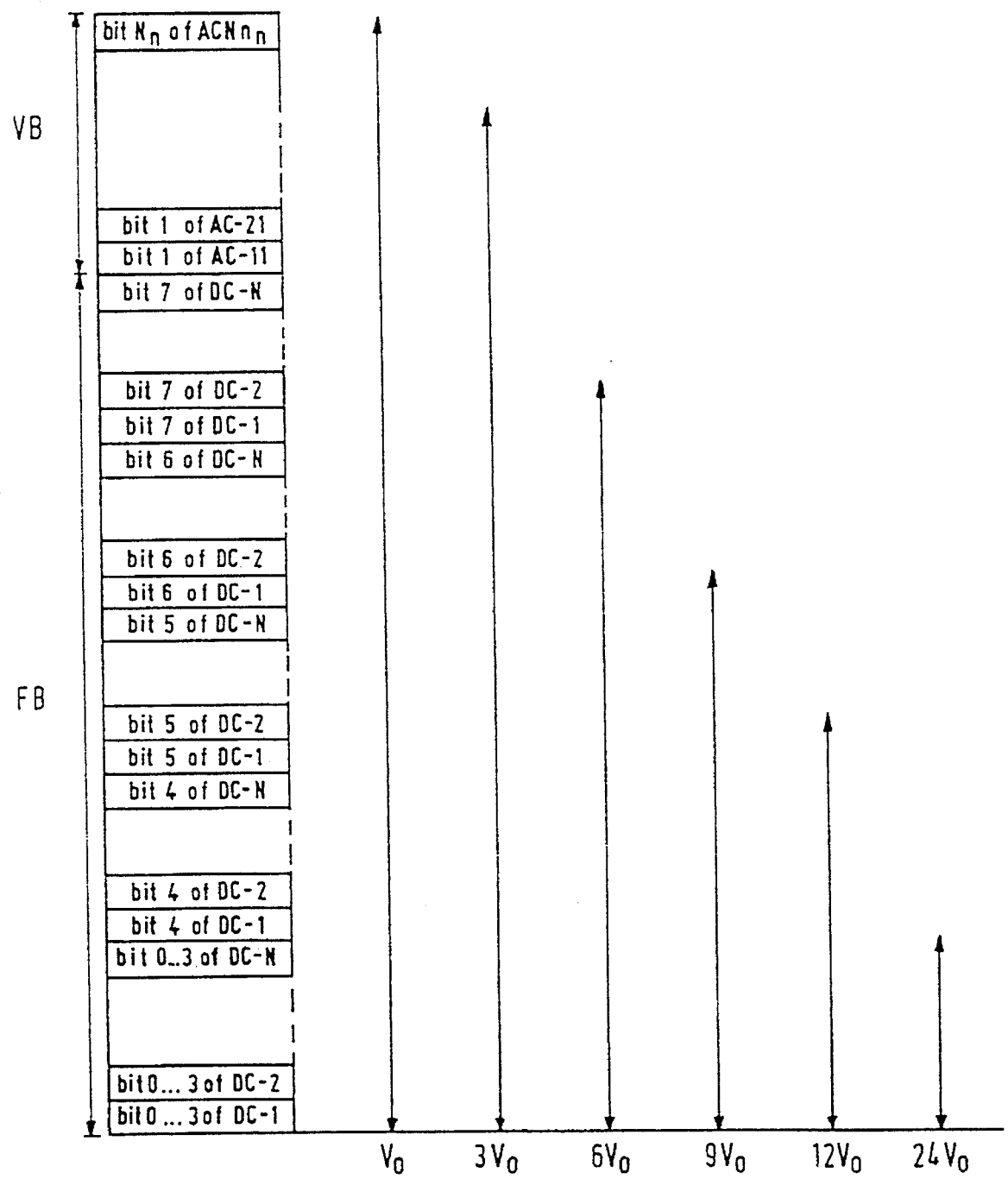
FIG. 7 illustrates more in detail the recording of the information on a track, and the portion of a track readable at different multiples of the recording speed.

A possible arrangement of the data in the super fixed block of a track is illustrated in detail in FIG. 7. First the four most significant bits of the first DC coefficient are recorded. Next the four most significant digits of the second DC coefficient, and so on until the first 4 most significant digits of all N=M/6 blocks on the track have been entered. The reason that the four most significant bits of each DC coefficient are recorded together is because at least four bits of the DC coefficient are required for acceptable image quality. Next, to be entered is the fifth most significant bit of all DC coefficients, then the sixth, and so on, until all seven bits of the DC coefficients of the blocks on the tracks have been recorded.

Next come the most significant bits of the AC coefficients until all most significant bits of the first AC coefficient of each block have been recorded.

Also shown in FIG. 7 are lines with arrows indicating the fields of usable data read from the illustrated track at different search speeds. At a search speed equal to three times the recording speed $V_0$, 25% of the total track will be read, i.e. the whole fixed wordlength part of the data will be available. At a search speed equal to six times the recording speed, 1/10 of the total track which is a substantial part of the fixed portion SFB will be read. The values continue to decrease until at a search speed equal to 24 times the recording speed only the 4 most significant bits of the DC coefficients would be read out. Though this will cause a rougher quantization of the grey-scale for the different blocks, the image thus obtained is still acceptable in that sense that the displayed image can still be recognized.

Figure 8:
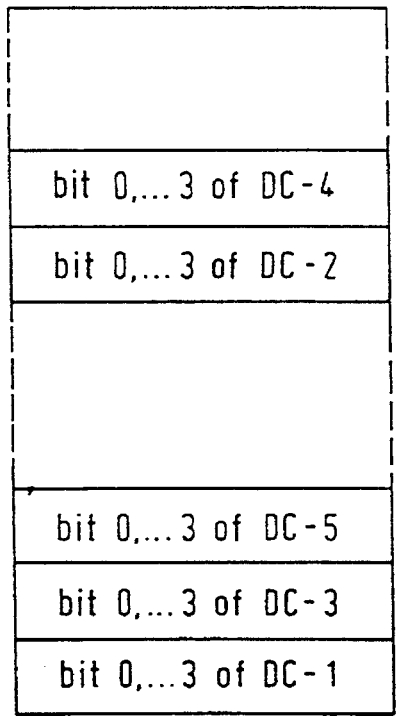
FIG. 8 shows another recording format according to the present invention.

At higher search speeds, however, the fraction of data read from each track becomes so small that it then becomes more desirable to use fewer blocks and to interpolate the missing ones. The recording of the fixed portion of the track for this type of processing is illustrated in FIG. 8. Here the four most significant bits of the DC coefficient of the first block are followed by those of the third block, next those of the fifth block, etc. until the most significant bits of all odd-numbered blocks have been recorded. Next follows the same data for the even-numbered blocks. At a search speed higher than 24 times the recording speed, the available DC data from the odd-numbered blocks will be used to interpolate the corresponding data for the even-numbered blocks in the playback system. Search speeds of 48 times the recording speed can thus be achieved with, of course, a deterioration in image quality.

A second problem exists with regard to the recording proposed herein. Since the most significant information is contained in the first 25% to 30% of each track, it is important that this first part of each track be read. Reference to FIG. 6 shows, however, that even at a search speed of 3 times the recording speed the first part of the track is only read for tracks 1 and 4 of each recorded frame Hn. The first part of tracks two, three, five and six of recorded frame n is never scanned. A shuffling scheme is thus adopted so that parts of the SFB fields of tracks 2, 3, 5 and 6 will be read out from the subsequent recorded frames n+1 and n+2, respectively. The result of this is that during one display frame period, segment data of three recorded frames n, n+1, n+2 can be read from tape. The shuffling scheme now guarantees that the data is distributed on tape in such a way that sufficient data is collected from the tape at that search speed to reconstruct a complete image, though all data for that image does not belong to the same frame.

Figures 9, 10:
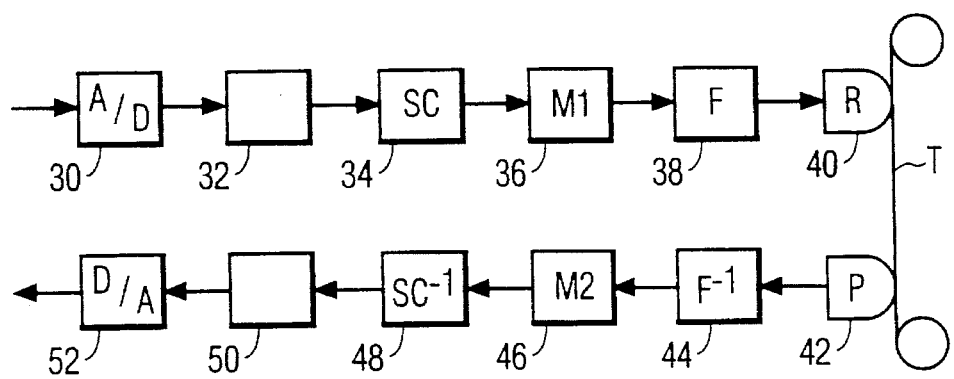
FIG. 9 shows track shuffling according to the present invention.
FIG. 10 shows an apparatus for carrying out the present invention.

A shuffling scheme to accomplish this purpose is illustrated in FIG. 9. It is a track shuffling scheme. In the first frame n, data is recorded in the order of track number starting at track 1. For the next frame, however, the information which would normally be recorded on track 2 is recorded on track 1. Similarly, the information recorded on the remaining tracks is that which would normally be recorded on the next track. Information which would normally be recorded on track 1 is recorded on track 6. Thus at a search speed of 3 $V_0$ information from tracks 2 and 5 of recorded frame n+1 will be read from tape. Finally, data from tracks 3 and 6 of recorded frame n+2 is read from tape. Thus at a search speed of 3 $V_0$, after 3 recorded frames have passed the scanning heads, the basic data required for the reconstruction of an image is available.

In FIG. 9, the circled numerals indicate the tracks from which information is read at a search equal to 12 times the recording speed $V_0$, while arrows point at the tracks from which information read at a search speed equal to 24 times the recording speed $V_0$. It will be noted that it is essential that the ratio of the search speed to the recording speed $V_0$, p, is an integral multiple or submultiple of the number of tracks per frame. It is further necessary that during one display frame period data from in this example six different tracks becomes available after a number of recorded frames not exceeding the said ratio has passed the recording heads. Thus, as already mentioned above, at a search speed equal to 3 times the recording speed tracks 1 and 4 will be read from the recorded frame n, tracks 2 and 5 in the recorded next frame n+1 and tracks 3 and 6 in the recorded third frame n+2.

For a search speed to recording speed ratio of 6, the information from the required six different tracks will be read from the first 6 recorded frames. At a search speed equal to 12 times the recording speed the first part of every 12th track, i.e. the first part of one track per two frames will be read, while at a search speed equal to 24 times the recording speed the first part of the first track of every 4th frame will be read. It will be clear that in the last situation the six required tracks will be read from twenty-four successively recorded frames.

FIG. 10 shows an apparatus for carrying out the method according to the invention. An incoming video signal in analog form is conveyed to a digital form in an analog/digital converter 30. The digital signal at the output of stage 30 is applied to a processing stage 32 in which the line-by-line pattern of the incoming signal is converted to a block pattern of 8×8 pixels each. The resulting blocks are coded in a source coder 34 in accordance with a discrete cosine transform (DCT). At the output of stage 34 there are therefore the DC coefficient as well as the AC coefficients with attendant addresses resulting from the discrete cosine transformation. These values are stored in a memory 36. Memory 36 is sufficiently large to hold all data for a group of blocks. Preferably, the memory is twice as large as that so as to allow one group of blocks to be written in the memory while a previous group is applied to a formatter circuit 38. In the formatter circuit 38 the data is read out from memory in the required order. It is then transmitted or recorded on a tape (recording medium) via a recording head 40.

Reception or playback takes place by means of a playback head 42 which applies its output to an inverse formatter circuit 44. The output of the inverse formatter circuit, which consists of the DCT coded blocks, is applied to a memory 46, the data stored therein being utilized by inverse source coder 48 to derive the original block data from the DCT coded blocks. A post-processor 50 then converts the data from blockform to the line-by-line scan required for the display. Finally, a digital/analog converter 52 furnishes an analog output suitable for display on a standard TV monitor.

Although the present invention has been described with respect to a specific preferred embodiment, various changes will readily occur to one skilled in the art. For example, a different order of data within the part of the track that will be read out at any given speed may be used. A different track shuffling scheme may be devised.

The invention can be used in conjunction with actuators, i.e. at speeds at which the actuators can no longer be properly controlled, etc. All these and others which will occur to one skilled in the art are intended to be encompassed in the following claims.

We claim:

1. A method of recording digital data defining a plurality of images on substantially parallel tracks of a recording medium at a recording first speed for playback at said first speed and at a second speed different from the first speed, comprising the steps of:
   a) generating image data defining each of said images,
      (i) said image data being produced by partitioning said image into a plurality of groups of blocks, with each block defining an incremental area of said image made up of a group of pixels, and encoding each of said blocks into a sequence of digital codewords representing coefficients, the first codeword being indicative of a DC coefficient for the block, subsequent codewords being indicative of AC coefficients for the block, each codeword being constituted by a sequence of bits of which the first bit is the most significant bit and subsequent bits are ordered in decreasing significance,
   b) recording said encoded block data on said parallel tracks such that:
      (i) at least the most significant bits of the codewords indicative of the DC coefficients of a first plurality of selected ones of a group of blocks are recorded on a predetermined part of one of said parallel tracks,
      (ii) at least the most significant bits of the codewords indicative of the DC coefficients of a second plurality of selected ones of the group of blocks, different from said first plurality, are recorded on a predetermined part of the remainder of said parallel tracks.

2. The method of claim 1, wherein the codewords of the encoded block data recorded on the predetermined part of said tracks is encoded in a fixed wordlength format.

3. The method of claim 1, wherein the most significant bits of the codewords indicative of the DC coefficients of the remainder of the blocks in the group, other than the first and second plurality of selected ones of the group of blocks, are recorded on the tracks immediately following the recorded most significant bits of said selected ones of said group of blocks.

4. The method of claim 1, wherein the location of said predetermined part of said tracks on said tracks where the most significant bits are recorded is a function of the ratio of said second speed to said first speed.

5. The method of claim 4, wherein the amount of data recorded on said predetermined part of said tracks is sufficient for image reconstruction at said second speed.

6. A method of recording digital data defining a plurality of images on substantially parallel tracks of a recording medium at a recording first speed for playback at said first speed and at a second speed higher than the first speed, comprising the steps of:
   a) generating image data defining each of said images,
      (i) said image data being produced by partitioning said image into a plurality of groups of blocks, with each block defining an incremental area of said image made up of a group of pixels, and encoding each of said blocks into a sequence of digital codewords representing coefficients, the first codeword being indicative of a DC coefficient for the block, subsequent codewords being indicative of AC coefficients including a plurality of most significant AC coefficients and a plurality of less significant AC coefficients, each codeword being constituted by a sequence of bits of which the first bit is the most significant bit and subsequent bits are ordered in decreasing significance,
   b) recording said encoded block data on said parallel tracks such that:
      (i) at least the most significant bits of the codewords indicative of the DC coefficients of a first plurality of selected ones of a group of blocks are recorded on a predetermined part of one of said parallel tracks,
      (ii) at least the most significant bits of the codewords indicative of the DC coefficients of a second plurality of selected ones of the group of blocks, different from said first plurality, are recorded on a predetermined part of the remainder of said parallel tracks.

7. The method of claim 6, wherein the encoded block data is recorded on the tracks of the medium in the order of codewords indicative of the most significant DC coefficients, codewords indicative of the most significant AC coefficients, and codewords indicative of the less significant AC coefficients in decreasing order of significance.

8. The method of claim 6, wherein said encoded block data results from subjecting the block of data to a transform coding operation.

9. The method of claim 6, wherein the second speed equals the first speed multiplied by an integer.

10. The method of claim 6, wherein a codeword indicative of a DC coefficient represents a DC level of the block.

11. The method of claim 6, wherein the tracks each have a beginning position, and the predetermined part of said one track is positioned at a given distance from said one track's beginning position and the predetermined part of at least some of said remainder of said tracks is positioned at a distance different from said given distance from said some of said remainder of said track's beginning position.

12. A recording medium having recorded on substantially parallel tracks thereof digital data defining a plurality of images, said digital data having been recorded at a recording first speed for playback at said first speed and at a second speed higher than the first speed, a) said digital data defining each of said images and having been produced by partitioning said image into a plurality of groups of blocks, with each block defining an incremental area of said image made up of a group of pixels, and encoding each of said blocks into a sequence of digital codewords representing coefficients, the first codeword being indicative of a DC coefficient for the block, subsequent codewords being indicative of AC coefficients including a plurality of most significant AC coefficients and a plurality of less significant AC coefficients, each codeword being constituted by a sequence of bits of which the first bit is the most significant bit and subsequent bits are ordered in decreasing significance, b) said encoded block data being recorded on said parallel tracks such that:
  (i) at least the most significant bits of the codewords indicative of the DC coefficients of a first plurality of selected ones of a group of blocks are recorded on a predetermined part of one of said parallel tracks,
  (ii) at least the most significant bits of the codewords indicative of the DC coefficients of a second plurality of selected ones of the group of blocks, different from said first plurality, are recorded on a predetermined part of the remainder of said parallel tracks.

13. The recording medium of claim 12, wherein the encoded block data is recorded on the tracks of the medium in the order of codewords indicative of the most significant DC coefficients, codewords indicative of the most significant AC coefficients, and codewords indicative of the less significant AC coefficients in decreasing order of significance.

14. The method of claim 12, wherein the tracks each have a beginning position, and the predetermined part of said one track is positioned at a given distance from said one track's beginning position and the predetermined part of at least some of said remainder of said tracks is positioned at a distance different from said given distance from said some of said remainder of said track's beginning position.

15. A method of recording digital data defining a plurality of images on substantially parallel tracks of a recording medium at a recording first speed for playback at said first speed and at a second speed different from the first speed, comprising the steps of:

a) generating image data defining each of said images,
  (i) said image data being produced by partitioning said image into a plurality of groups of blocks, each group of blocks representing a segment of an image and with each block defining an incremental area of said image made up of a group of pixels, and encoding each of said blocks into a sequence of digital codewords representing coefficients, the first codeword being indicative of a DC coefficient for the block, subsequent codewords being indicative of AC coefficients for the block, each codeword being constituted by a sequence of bits of which the first bit is the most significant bit and subsequent bits are ordered in decreasing significance, b) recording said encoded block data on said parallel tracks such that:
  (i) at least the most significant bits of the codewords indicative of the DC coefficients of a first plurality of selected ones of a group of blocks are recorded on a predetermined part of one of said parallel tracks,
  (ii) at least the most significant bits of the codewords indicative of the DC coefficients of a second plurality of selected ones of the group of blocks, different from said first plurality, are recorded on a predetermined part of the remainder of the same said one of said parallel tracks.

16. The method of claim 15, wherein the codewords of the encoded block data recorded on the predetermined part of said tracks is encoded in a fixed wordlength format.

17. The method of claim 15, wherein the most significant bits of the codewords indicative of the DC coefficients of the remainder of the blocks in the group, other than the first and second plurality of selected ones of the group of blocks, are recorded on the tracks immediately following the recorded most significant bits of said selected ones of said group of blocks.

18. The method of claim 15, wherein the location of said predetermined part of said tracks on said tracks where the most significant bits are recorded is a function of the ratio of said second speed to said first speed.

19. The method of claim 18, wherein the amount of data recorded on said predetermined part of said tracks is sufficient for image reconstruction at said second speed.

20. A method of recording digital data defining a plurality of images on substantially parallel tracks of a recording medium at a recording first speed for playback at said first speed and at a second speed higher than the first speed, comprising the steps of:

a) generating image data defining each of said images,
  (i) said image data being produced by partitioning said image into a plurality of groups of blocks, each group of blocks representing a segment of an image and with each block defining an incremental area of said image made up of a group of pixels, and encoding each of said blocks into a sequence of digital codewords representing coefficients, the first codeword being indicative of a DC coefficient for the block, subsequent codewords being indicative of AC coefficients including a plurality of most significant AC coefficients and a plurality of less significant AC coefficients, each codeword being constituted by a sequence of bits of which the first bit is the most significant bit and subsequent bits are ordered in decreasing significance, b) recording said encoded block data on said parallel tracks such that:
  (i) at least the most significant bits of the codewords indicative of the DC coefficients of a first plurality of selected ones of a group of blocks are recorded on a predetermined part of one of said parallel tracks,
  (ii) at least the most significant bits of the codewords indicative of the DC coefficients of a second plurality of selected ones of the group of blocks, different from said first plurality, are recorded on a predetermined part of the remainder of the same said one of said parallel tracks.

21. The method of claim 20, wherein the encoded block data is recorded on the tracks of the medium in the order of codewords indicative of the most significant DC coefficients, codewords indicative of the most significant AC coefficients, and codewords indicative of the less significant AC coefficients in decreasing order of significance.

22. The method of claim 20, wherein said encoded block data results from subjecting the block of data to a transform coding operation.

23. The method of claim 20, wherein the second speed equals the first speed multiplied by an integer.

24. The method of claim 20, wherein a codeword indicative of a DC coefficient represents a DC level of the block.

25. The method of claim 20, wherein the tracks each have a beginning position, and the predetermined part of said one track is positioned at a given distance from said one track's beginning position and the predetermined part of at least some of the remainder of said tracks is positioned at a distance different from said given distance from said some of said remainder of said track's beginning position.

26. The method of claim 20, wherein the predetermined parts, for recording at least the most significant bits of the codewords indicative of the DC coefficients of the first plurality of selected ones of a group of blocks, on each of the tracks have corresponding positions relative to each track's beginning position.

27. A recording medium having recorded on substantially parallel tracks thereof digital data defining a plurality of images, said digital data having been recorded at a recording first speed for playback at said first speed and at a second speed higher than the first speed, a) said digital data defining each of said images and having been produced by partitioning said image into a plurality of groups of blocks, each group of blocks representing a segment of an image and with each block defining an incremental area of said image made up of a group of pixels, and encoding each of said blocks into a sequence of digital codewords representing coefficients, the first codeword being indicative of a DC coefficient for the block, subsequent codewords being indicative of AC coefficients including a plurality of most significant AC coefficients and a plurality of less significant AC coefficients, each codeword being constituted by a sequence of bits of which the first bit is the most significant bit and subsequent bits are ordered in decreasing significance, b) said encoded block data being recorded on said parallel tracks such that:
  (i) at least the most significant bits of the codewords indicative of the DC coefficients of a first plurality of selected ones of a group of blocks are recorded on a first predetermined part of one of said parallel tracks,
  (ii) at least the most significant bits of the codewords indicative of the DC coefficients of a second plurality of selected ones of the group of blocks, different from said first plurality, are recorded on a second predetermined part of the remainder of the same said one of said parallel tracks
  (iii) each of said parallel tracks having recorded thereon corresponding DC coefficients in the same corresponding first predetermined parts.

28. The recording medium of claim 27, wherein the encoded block data is recorded on the tracks of the medium in the order of codewords indicative of the most significant DC coefficients, codewords indicative of the most significant AC coefficients, and codewords indicative of the less significant AC coefficients in decreasing order of significance.

29. The method of claim 27, wherein the tracks each have a beginning position, and the predetermined part of said one track is positioned at a given distance from said one track's beginning position and the predetermined part of at least some of said remainder of said one track is positioned at a distance different from said given distance from said track's beginning position.

\* \* \* \* \*